(12) United States Patent
Smith et al.

(10) Patent No.: US 6,966,828 B2
(45) Date of Patent: Nov. 22, 2005

(54) MONEY TUBE AND ASSOCIATED DISPENSING UNITS

(75) Inventors: Michael J. Smith, Scottsburg, IN (US); Richard Thurman, Louisville, KY (US); Richard R. Cornell, Jr., New Albany, IN (US)

(73) Assignee: Fire King International, Inc., New Albany, IN (US)

( * ) Notice: Subject to any disclaimer, the term of this patent is extended or adjusted under 35 U.S.C. 154(b) by 575 days.

(21) Appl. No.: 10/042,131

(22) Filed: Oct. 19, 2001

(65) Prior Publication Data

US 2002/0147692 A1 Oct. 10, 2002

Related U.S. Application Data

(63) Continuation-in-part of application No. 09/825,912, filed on Apr. 4, 2001.

(51) Int. Cl.$^7$ ............................................... G07D 1/00
(52) U.S. Cl. .......................... 453/18; 453/61; 453/63; 206/0.8
(58) Field of Search ............................ 453/18, 61, 63, 453/58, 60, 16; 206/0.8, 0.82; 53/212, 254; 220/4.04, 4.08

(56) References Cited

U.S. PATENT DOCUMENTS

| | | | | |
|---|---|---|---|---|
| 463,256 A | * | 11/1891 | Side ............................ | 232/5 |
| 475,563 A | * | 5/1892 | Howe ......................... | 206/0.81 |
| 1,110,174 A | * | 9/1914 | Zander ......................... | 232/5 |
| 1,757,008 A | * | 5/1930 | Doble ........................ | 206/0.82 |
| 2,977,736 A | * | 4/1961 | Condis ........................ | 53/254 |
| 3,346,109 A | * | 10/1967 | Duran ........................ | 206/0.82 |
| 4,479,502 A | * | 10/1984 | Iversen ........................ | 453/61 |
| 4,502,120 A | | 2/1985 | Ohnishi et al. | |
| 5,164,718 A | | 11/1992 | Cedergren | |
| 5,573,109 A | * | 11/1996 | Isacson ....................... | 206/38.1 |
| 5,733,186 A | | 3/1998 | Leibu | |
| 5,883,371 A | | 3/1999 | Meeker | |
| 6,067,530 A | | 5/2000 | Brooks, Jr. et al. | |
| 6,105,864 A | | 8/2000 | Shiobara et al. | |
| 6,709,325 B2 | * | 3/2004 | Korsen ........................ | 453/61 |
| 6,789,664 B1 | * | 9/2004 | Chao .............................. | 206/5 |

FOREIGN PATENT DOCUMENTS

GB 2 246 897 A 2/1992

* cited by examiner

Primary Examiner—Donald P. Walsh
Assistant Examiner—Mark J. Beauchaine
(74) Attorney, Agent, or Firm—Brooks Kushman P.C.

(57) ABSTRACT

A first embodiment of a money tube includes a centrally divided tube body having a first end, a second end, and a central portion. The tube body is composed of a first body portion and a second body portion. The first body portion includes the first end and defines a first central connector. The second body portion includes a second end and defines a second central connector. The first and second central connectors engage each other at the tube body central portion when connected to each other to hold the first body portion and the second body portion together.

20 Claims, 7 Drawing Sheets

MONEY TUBE AND ASSOCIATED DISPENSING UNITS

CROSS-REFERENCE TO RELATED APPLICATION

This application is a continuation-in-part of U.S. application Ser. No. 09/825,912 filed Apr. 4, 2001.

BACKGROUND OF THE INVENTION

1. Field of the Invention

The present invention relates to electronic lock and money control systems such as used by merchants to collect and dispense money during business operation, and to a system capable of stand alone operation as well as expanded networking and control of multiple electronic lock and money collection/dispensing units, and more particularly to money tubes used with associated stand alone or networked dispensing units.

2. Background Art

Generally, because merchants tend to maintain only a minimal amount of money in cash registers, accumulated money/cash is periodically transferred to an on-site safe or drop box. This reduces the amount of money present at a cash register and potential exposure to loss due to robbery. Some safes include electronic money verification and change dispensing units which allow the safes to not only receive money, but to provide some form of automation for dispensing money as well as making change. As a result, money can be exchanged for smaller, denominations and coins, or deposited for security and accounting.

Dispensing units dispense money in money tubes. The tubes are held by a tube rack within the dispensing unit. An existing money tube consists of a clear plastic tube and a plastic snap cap. The caps sometimes come off during the process of insertion into the tube rack, come off while in the tube rack, and come off during dispensing from the tube rack. This results in jams, misfeeds, and causes miscounts. There is a need for an improved money tube that does not allow the tube to come apart while in the tube rack columns, and that is unlikely to separate during insertion and dispensing.

In the case of large business establishments, numerous safe units may be located at various locations throughout the store. Unfortunately, management, accounting, and oversight/maintenance of each machine requires long and tedious efforts. In addition, integration of additional units into an existing business generally requires a large expenditure to replace existing units for more sophisticated units. As a result, a further need exists for an electronic lock and money control system and corresponding system units capable of cost effectively integrating additional system units, as well as provide more efficient system management and accounting operations to improve overall safekeeping, receiving, dispensing and accounting of money within the system.

SUMMARY OF THE INVENTION

Therefore, it is an object of the present invention to provide a money tube and associated dispensing units that make the tracking of money in the tube rack more accurate, and with parts that are unlikely to separate during insertion and dispensing.

In carrying out the above object, a money tube for use in a money dispensing unit is provided. The money tube comprises a centrally divided tube body having a first end, and a second end, and a central portion. The tube body is composed of a first body portion and a second body portion. The first body portion includes the first end and defines a first central connector. The second body portion includes the second end and defines a second central connector. The first and second central connectors engage each other at the tube body central portion when connected to each other to hold the first body portion and the second body portion together.

In a preferred implementation, the first central connector is a female type connector and the second central connector is a male type connector. Overlapping engagement of the female type connector and the male type connector holds the first body portion and the second body portion together.

Preferably, the overlapping engagement is an interference fit. In one embodiment, the male type connector includes an outwardly extending post, and the female type connector includes an L-shaped slot receiving the post during the overlapping engagement.

Further, in a preferred implementation, the tube body first and second ends are closed ends, and the tube body is generally cylindrical with a circular cross-section. Further, a preferred money tube has first and second body portions formed of molded plastic.

Further, in carrying out the present invention, a money tube is provided in combination with a money dispensing unit. The money dispensing unit has a housing including a set of openings in the housing arranged to be loaded with money tubes. Each opening corresponds to a particular denomination of money. For example, there is an opening for receiving money tubes containing pennies, another opening for receiving money tubes containing nickels, etc., including openings for receiving money tubes containing paper money. Each money tube contains money of a predetermined value. For example, a money tube containing quarters may contain ten dollars in quarters. The housing includes a separate opening and dispensing tray to dispense money tubes for removal from the dispensing unit.

The money tube includes a centrally divided tube body having a first end, a second end, and a central portion. The tube body is composed of a first body portion and a second body portion. The first body portion includes the first end and defines a first central connector. The second body portion includes the second end and defines a second central connector. The first and second central connectors engage each other at the tube body central portion when connected to each other to hold the first body portion and the second body portion together.

Still further, in carrying out the present invention, a money tube for use in a money dispensing unit is provided. The money tube comprises a centrally divided tube body having a first end, a second end, and a central portion. The tube body is composed of a first body end portion, a second body end portion, and a body middle portion. The first body end portion includes the first end and defines a first central connector. The second body end portion includes the second end and defines a second central connector. The first and second central connectors engage the body middle portion at the tube body central portion to hold the first body end portion and the second body end portion to the body middle portion. In one embodiment, the first and second central connectors engage each other at the tube body central portion.

Further, in carrying out the present invention, a money tube is provided in combination with a money dispensing unit. The money dispensing unit has a housing including a set of openings in the housing arranged to be loaded with money tubes. Each money tube contains money of a predetermined value. The housing includes a separate opening and dispensing tray to dispense money tubes for removal from the dispensing unit.

The money tube includes a centrally divided tube body having a first end, a second end, and a central portion. The tube body is composed of a first body end portion, a second body end portion, and a body middle portion. The first body end portion includes the first end and defines a first central connector. The second body end portion includes the second end and defines a second central connector. The first and second central connectors engage the body middle portion at the tube body central portion to hold the first body end portion and the second body end portion to the body middle portion. In one embodiment, the first and second central connectors engage each other at the tube body central portion.

The advantages associated with embodiments of the present invention are numerous. Money tubes of the present invention may be used together with various types of dispensing units, including a controller unit, a remote unit that is used together with a controller unit, or a stand alone unit. That is, money tubes may be used with any type of dispensing unit. Advantageously, the center-divided tubes do not require traditional caps, which are easily lost, while providing secure capture of contents while loaded into dispensing safes.

The above objects and other objects, features, and advantages of the present invention are readily apparent from the following detailed description of the preferred embodiment when taken in connection with the accompanying drawings.

DETAILED DESCRIPTION OF THE PREFERRED EMBODIMENTS

The present invention provides a stand alone electronic lock and money collection/dispensing unit, i.e., safe, that can also operate as a centralized network control unit when coupled to one or more remote electronic lock and money collection/dispensing units.

Figure 1:
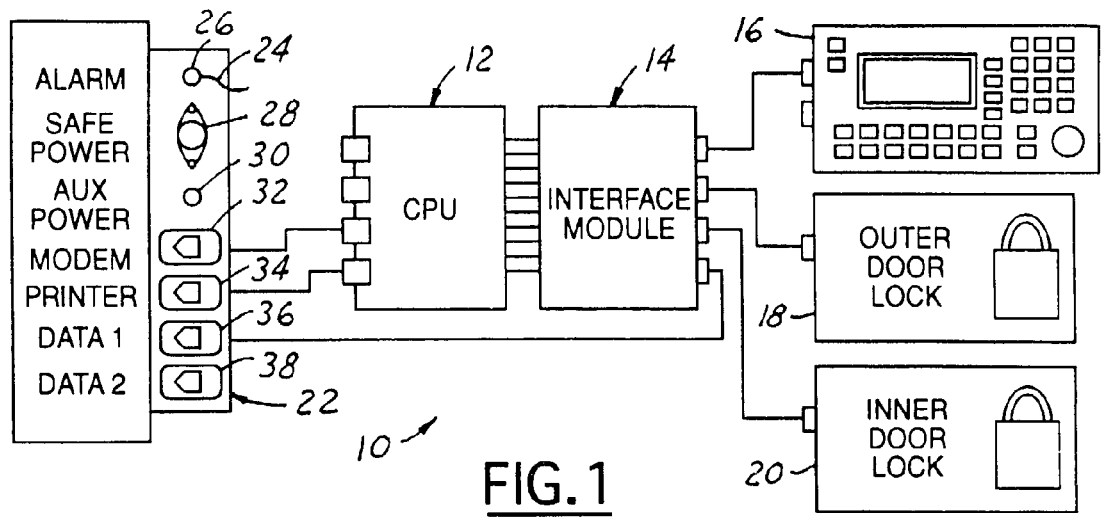
FIG. 1 is a block circuit diagram of a safe/central network control unit in accordance with a first embodiment.

FIG. 1 illustrates a block circuit diagram of a safe/central network control unit 10 in accordance with a first embodiment. A control system includes a CPU 12 programmed to control operation of safe 10. CPU 12 also operates as a central network controller when interfaced with one or more remote/slave units and their associated components and keypads via a data bus. An interface module 14 connects the CPU to a keypad and electronic display device 16, an outer door lock mechanism 18, and an inner door lock mechanism 20. The CPU and its interface module are preferably mounted behind a protected inner door within the unit.

Figure 2:
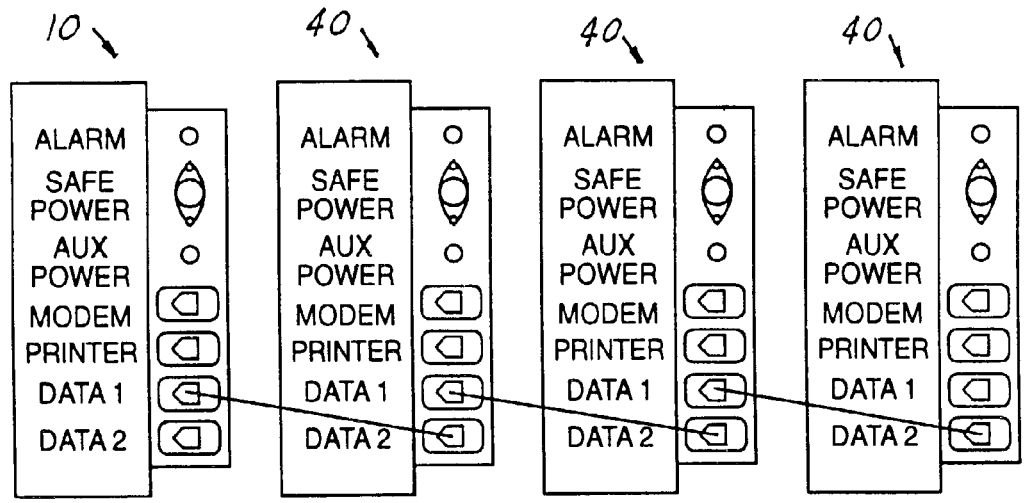
FIG. 2 is a front view of multiple wiring/connector interface panels connected together in a network.

A wiring/connector interface panel 22 is provided on the housing of the electronic lock and money collection/dispensing unit. In an exemplary embodiment, an alarm cable 24 can be fed through an opening 26 in the interface panel to provide connection to an external alarm system (not shown). A safe power connector 28 is provided to allow connection to an external switch-mode type power supply (not shown) arranged to produce voltages required by the display and other internal electronics of safe 10. An auxiliary power connection 30 can be provided for any devices such as a bill validator (described below) that require an additional power supply. A modem connection 32, such as a standard RJ-45 port, allows connection to a conventional external modem such as for remote diagnostics and/or network monitoring and reporting. Other standard cable connectors can be used. A printer connection 34, such as a standard RJ-45 port, is used to connect a printer to the electronic lock and money collection/dispensing unit. Finally, a DATA 1 port 36 and DATA 2 port 38 are provided to allow connection to other remote/slave electronic lock and money collection/dispensing units. More specifically, as shown in FIG. 2, the DATA 1 and DATA 2 ports are used to connect (in a daisy chain configuration) the central controller unit 10 to multiple remote units 40, including any associated electronic locks, validators, and dispensing systems. These remote units operate as slave units within the network.

The locking system hardware depends on the type of door. For example, inner doors can use basic spring-loaded knob locks. When an operator unlocks an inner door, the control system sends a control signal to a lock mechanism solenoid. Once the lock solenoid is energized, the knob can be turned to unlatch and open the door.

An outer door provides the first line of physical security. An inner door is any door that cannot physically be opened unless an outer door is first opened. The use of one or more inner doors allows general access to the safe for getting tills, change, and so forth while allowing larger deposit funds or valuables to remain secured behind an inner door. Instead of a knob, an outer door can utilize a handle controlled by energizing of a lock solenoid to allow the handle to be turned. Linkage connected to the handle retracts one or more lock bolts. Once retracted, the bolt(s) are held back by a detent allowing the door to be opened. When the door shuts, the bolts can be automatically re-engaged. The lock solenoid is de-energized to prevent the boltwork from retracting when attempting to turn the handle.

The lock mechanism (not shown) only responds to commands and replies to instructions from the control processor. A lock mechanism in a remote safe can be set-up to respond only to the central control unit. The lock is arranged to store basic data including an encrypted identification number, a list of the most recent log entries, and associated setup properties.

Door sensors (not shown) mounted in the lock and on the outer door sense door status and provide appropriate signaling to the control processor. Thus, if a door remains open too long, an alarm can be triggered by the control processor. The door sensors can signal the control processor to trigger a burglary alarm signal if a door is sensed as being opened without prior signaling from the control processor.

Money is placed behind a lock by making a drop. When cash is dropped, the user making the drop is credited for the money added to the system. Money is later removed from the system by opening the door in front of the cash. For example, if a Shift Supervisor makes a $200 manual drop to an inner compartment, a corresponding credit is logged. When money is removed such as for making a bank deposit, the person credited with opening the door is also credited with the withdrawal from the system.

Figure 3:
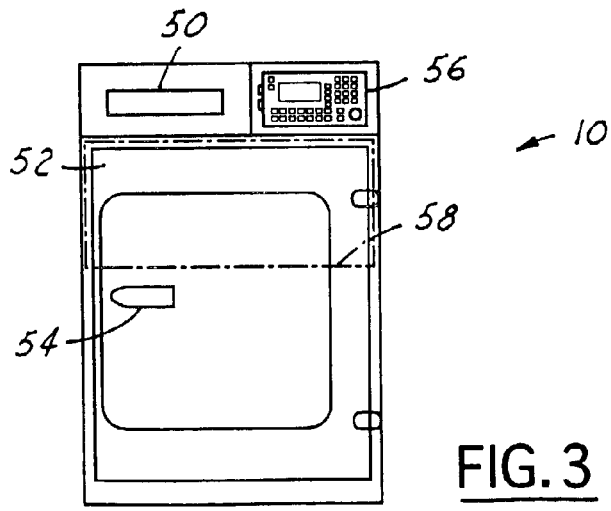
FIG. 3 is a front view of a safe in accordance with the first embodiment of the present invention.

FIG. 3 provides a front view of an exemplary unit in accordance with the first embodiment of the present invention. More specifically, a manual drop drawer 50 includes an opening to facilitate manual dropping of money/cash by allowing an envelope having the money and a drop receipt therein to be inserted into the electronic lock and money collection/dispensing unit. The drawer can be arranged to prevent extracting cash back through the opening after it is dropped inside. An outer door 52 is provided for example from ½ inch A-36 steel and equipped with a high quality boltwork for optimum security and efficiency in operation. An "L" style handle 54 turns 90° right (clockwise) to open the door. When the handle is turned, the bolts retract and the lock opens. When the door shuts, a spring loaded detent mechanism fires the bolts to lock the door. The handle automatically returns to the locked position. A keypad and display module 56 is shown mounted to the outside of housing. An inner compartment 58 is denoted in dashed outline to indicate an approximate location. This compartment is used to hold manual drops, and is protected by its own inner door and lock mechanism.

Figures 4, 6:
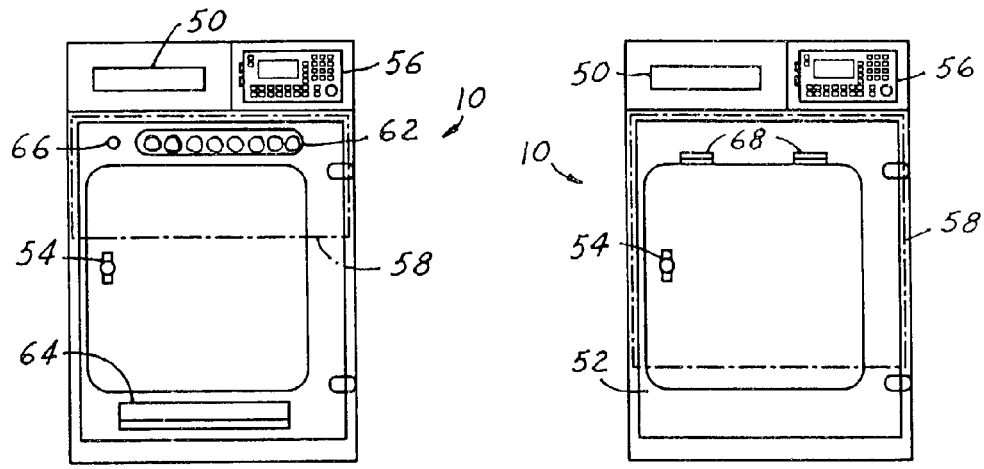
FIG. 4 is a front view of a safe in accordance with a second embodiment of the present invention.
FIG. 6 is a front view of a safe in accordance with a third embodiment of the present invention.
Figure 5:
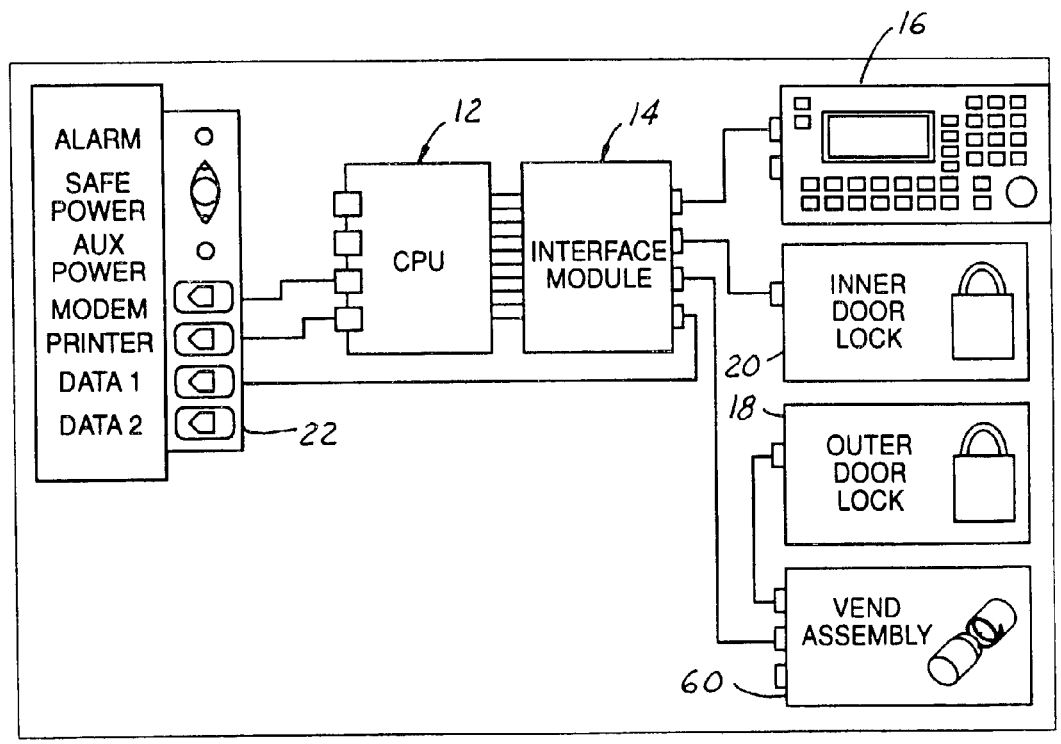
FIG. 5 is a block circuit diagram of a safe/central network control unit in accordance with the second embodiment.

Another exemplary embodiment is shown in FIG. 4. The associated block circuit diagram is shown in FIG. 5. In this embodiment, the electronic lock and money collection/dispensing unit 10 is equipped with a money dispensing/vending mechanism assembly 60. Like elements to those described above have been denoted with like reference numbers. More specifically, the housing, such as outer door 52, includes a set of round openings 62, i.e., "columns" or "chutes," formed therein to receive money-filled tubes to facilitate loading of tubes into the dispensing/vending mechanism. The chutes are individually numbered for system identification. Vended tubes drop out to a dispensary capture tray 64 located in the housing or outer door. The vending mechanism can be mounted on the inside surface of the housing or outer door, and include a series of optical sensors that track tube status, and a set of motors that control operation of tube vending baffles. The nature of the baffles prevents unauthorized access to the tubes from the opening in the housing created by the dispensary capture tray. The vending mechanism includes electronics coupled to interface module 14 and outer door lock 18.

Tubes are assumed to hold a certain amount of money based on the column in which they are loaded. For example, column 1 may be setup to hold rolls of pennies in its tubes. Tubes can be sized to accept all known coin sizes from around the world, as well as to accept, in certain circumstances, rolled-up paper currency. Each penny roll is standardized, such as to a value of $0.50. Therefore, each tube is accounted for at $0.50 each. Likewise, column 2 can be setup to hold tubes of nickels standardized at $2.00 each, and so on for the remaining columns. In this manner, the system can track in real-time the loading and vending of tubes, as well as report the credits, debits, and cash on hand based on the number of tubes added to or removed from each column of a particular dispensing unit.

A keyswitch 66, such as a Medeco® keyswitch, can be provided to control operation of a tubelock (not shown). The tubelock itself is a moveable bar that blocks the chute openings at the exterior surface of the door. When the tubelock is locked, tubes (and debris) cannot be loaded through the chutes. Such an arrangement prevents unauthorized loading as well as any attempts to extract a tube out through the chutes. The preferred embodiment for the money tubes is best shown in FIGS. 12–19, described later herein.

Figure 7:
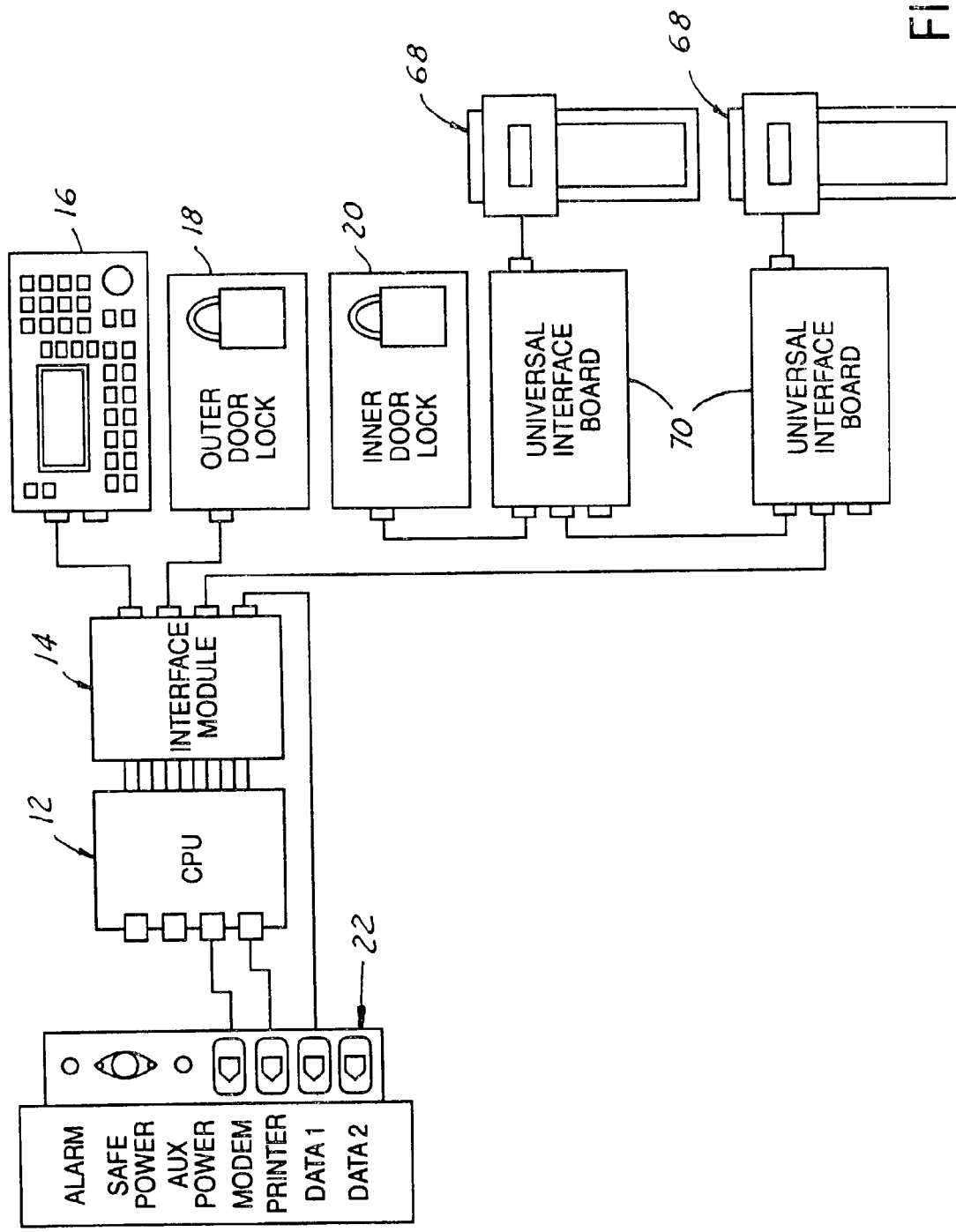
FIG. 7 is a block circuit diagram of a safe/central network control unit in accordance with the third embodiment.
Figure 8:
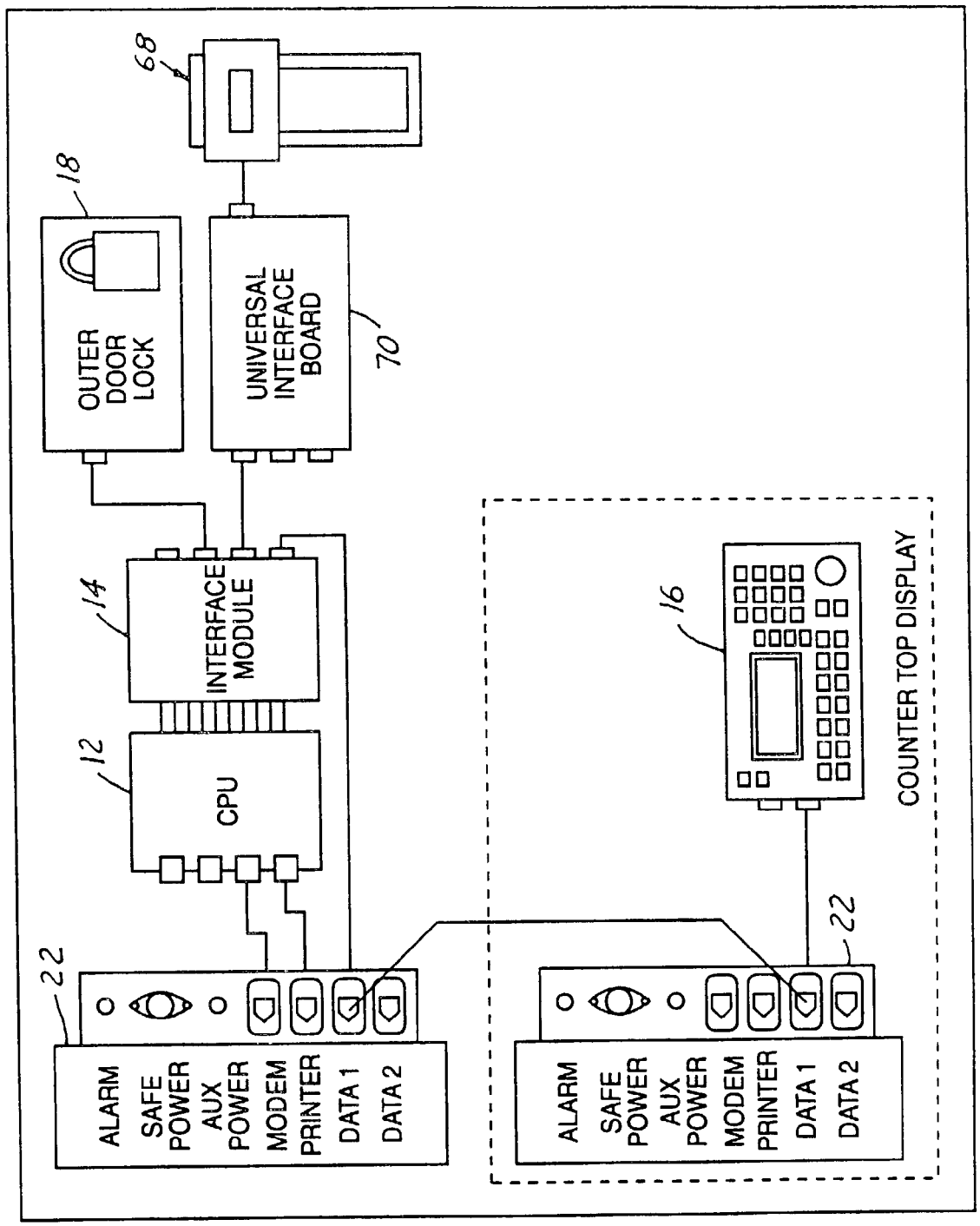
FIG. 8 is a block circuit diagram of a safe/central network control unit having a remote keypad module in accordance with the present invention.

Still another exemplary embodiment is shown in FIG. 6. The associated block circuit diagram is shown in FIG. 7. In this embodiment, one or more bill validators 68 are located on the unit. Each bill validator 68 includes an opening for insertion of paper currency, and a removable storage cassette (not shown) mounted internally for storage of bills that pass through the validator. Bill validation provides a secure and accurate method of collecting and storing incoming cash throughout the day. An operator enables a bill acceptor from the control panel and inserts one or more bills. The keypad/display control panel can be mounted to the exterior of the unit housing, or remotely as shown in FIG. 8 for convenient positioning such as on a counter near a cash register. The bill validator is arranged with appropriate hardware and programing to draw in the bill, validate the bill for authenticity and denomination, stack the bill in its cassette, and count the number and type of bills. The CPU stores the data into memory. A validator can be mounted to the housing such as via bracket assemblies located behind an outer and/or inner door.

A Universal Interface Board (UIB) 70 is used to interface each validator's electronics with the interface module 14. A UIB is arranged to respond to commands and replies to instructions from the device processor. The primary purpose of the UIB is to format data communicated between the validator and the CPU. The UIB stores basic data including an encrypted identification number, a list of the most recent audit trail entries, its own name, and associated setup properties.

A UIB can serve as a device processor. A lock control processor can also operate as a device processor. As shown, if more than one validator is used, each validator has its own UIB. One is made the master and connects directly to the main data bus, while the second UIB connects to the master UIB via an auxiliary data bus. One or more lock mechanisms can be coupled to communicate with the master UIB which, in turn, communicates with the system controller.

Figure 9:
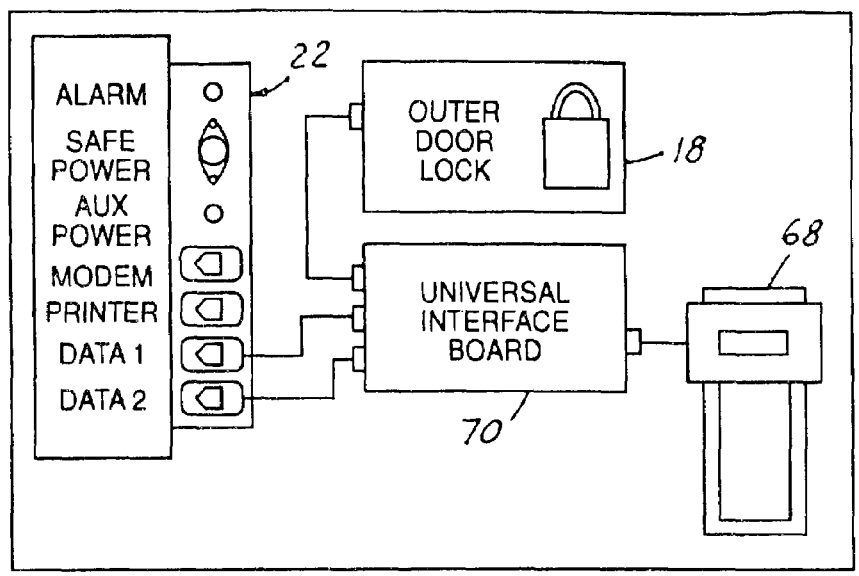
FIG. 9 is a block circuit diagram of a remote/slave safe unit having a bill validator.
Figure 10:
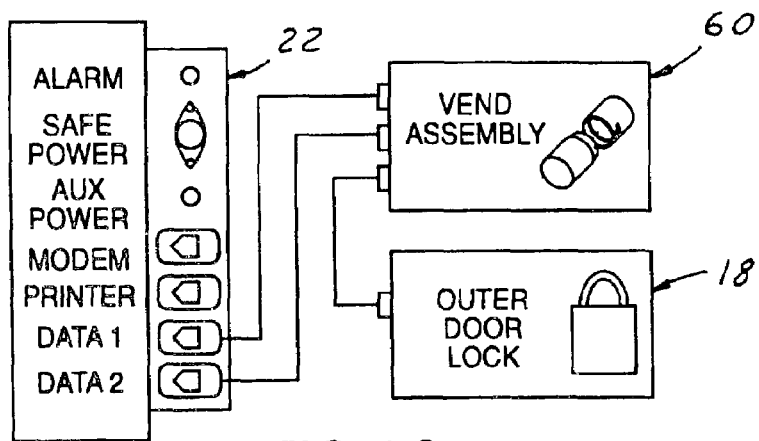
FIG. 10 is a block circuit diagram of a remote/slave safe unit having a vend mechanism.

As is demonstrated by the different embodiments, the present invention provides a very flexible system capable of custom configuration because the electronic lock and money collection/dispensing unit(s) can be arranged based on a desired configuration. For example, some applications may require an electronic lock and money collection/dispensing unit to perform advanced auditing capability, but do not require bill validation or dispensing capability. For those applications, the first embodiment is best suited. As shown in FIGS. 9 and 10, remote system units, i.e., units without a CPU/local control system, can be configured with bill validator(s) 68 and associated UIB(s) 70 and/or vend mechanisms 60. Such remote units and their associated components operate under control of the central control unit CPU.

Each device and/or component circuit board is provided with a unique serial number. The central controller is arranged to detect the presence of a device or component on the network probing serial numbers to identify those that are on the network. Following identification of the serial numbers, the device types are requested and network addresses are assigned to each serial number. Following this, each device is locked down with a CPU serial number and security tokens known only to the central controller and the device.

A device is added to the network by the central controller broadcasting a polling type message to determine if there are any devices coupled to the network that are not registered with the central controller. Any device that responses is then queried as to its type and any sub-components. The network information is then updated accordingly to add the device or component to the network.

Figure 11:
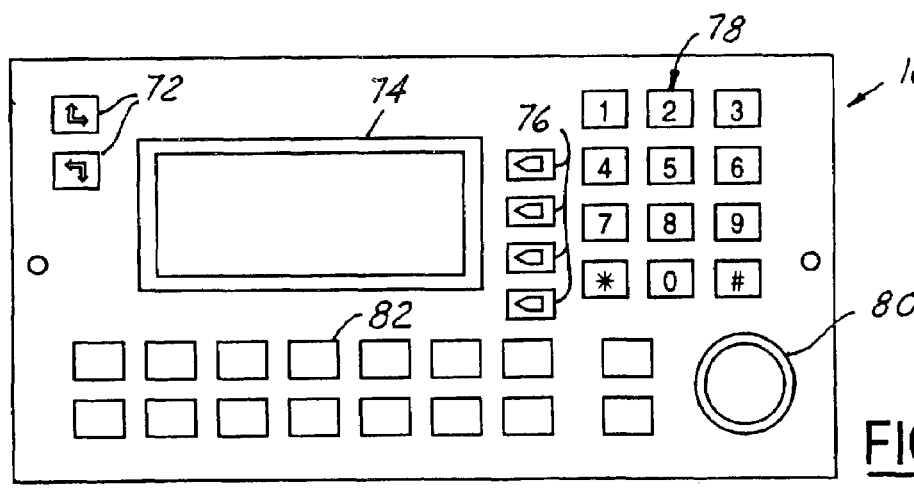
FIG. 11 is a front view of an exemplary embodiment of a display and keypad module.

An exemplary embodiment of a display and keypad module 16 is shown in FIG. 11. A set of buttons 72 are provided for scrolling through display options. The top scroll button scrolls up through a pick list or to the right if a line on the screen exceeds 20 characters, and the lower scroll button scrolls down or to the left. A fluorescent, LCD, or other suitable type of display 74 is provided.

A set of selection buttons 76 are provided, such as one for each row of the display, to allow a user to enter desired selections. A numeric keypad 78, including function keys such as an enter and clear key, is also provided. A key port 80 is provided to allow insertion and reading of electronic keys. Such an arrangement limits access to the system to authorized individuals.

A set of action buttons 82 are provided depending on the application. For example, a LOAD button is used when loading tubes to the dispensing system; a VEND button is used to dispense change tubes from the dispensing system; a DROP button is used when making manual or validator drops; an UNLOAD button is used to empty all tubes from a column for maintenance; a DOORS button is used when opening safe doors; a BUY CHANGE button is used when purchasing change from the dispensing unit by making a drop to a validator; a DISPLAY button is used to check system information such as time and date, various delays that may be in progress, and obtain general system information including technical support contact information; a PRGM (program) button is used to enroll or modify users, or to edit system setup parameters; a DROP SET button is used to setup drop operations; an ESC button allows the operator back up a full step at almost any point in almost any procedure, and also allows positive user completion of certain activities such as loading tubes or making validator drops; and a HELP button allows assistance information to be displayed.

As noted above, a safe may be configured to allow manual drops. Manual drops are made by inserting an envelope of money into a safe using a drop drawer. If the safe is not equipped with a validator, this is the only way (for accounting purposes) to put cash into the safe. The drop drawer is arranged to prevent extraction of the money back through the drawer opening once it has been closed and the drop completed. The drop drawer can also be equipped with an electronically controlled lock for additional security.

The central control unit is arranged through suitable programming to track and report the complete history of each unit in the system. In other words, all operations performed are recorded with a transaction number, time stamp, identifier of the person performing the action, and the details of the event, and communicated to the central control unit. For example, a unit will record the identity of the person who opens a safe door, when the door was opened, how long it remained open, and whether that user chose to remove any available cash from behind that door. This information is then sent to the central control unit.

The central control unit's CPU is programmed to generate various reports for printing or display. More specifically, financial reports can include individual user reports, cash (on hand), and end day reports. The system allows any user or operator, regardless of report permission, to view or print their own user report for a particular shift. Cash reports show actual cash present in the system by location. For example, money is reported per validator, per manual drop compartment, and per column of each dispensing unit. An audit report can be generated to show every event in the system during a specific time period. All financial data is derived from the audit. The audit can also be used to track personnel activity, such as the identity and time associated with a person logging into a particular feature. This sort of data is useful not only for theft detection and deterrence, but also for tracking operational trends. An audit data reported may be limited to a single user, system device, or event type for a given period.

As noted above, the central control unit is arranged to collect and sort information to provide reports detailing network or individual user activity. The central control unit can also be programmed to conduct a set of device and system self diagnostic routines to provide a status report regarding operation of hardware, communication, and alarm components.

As an example, a user report can be generated to print or view information such as: (1) a list of all bills validated by denomination (if any validators exist in the system) as well as all doors opened (including the number of times opened) by a user; (2) a list of all cash locations in the system and the amount of money dropped into each by the user as well as all vend assemblies in the system and the amount of money loaded into each by the user; (3) a list of all cash locations in the system and the amount of money removed from each by the user; (4) a total of all transactions associated with the user including money added to all manual drops and validator drops, cash removed from drops, and total taken from vend (vend or unload), as well as a net total for the user.

An end day report includes a series of operator reports (one for each operator in the system who was active during the business day), and a copy of a cash report. The end day report also includes a net activity section that lists bills validated by denomination (if any validators exist in the system) and lists all doors and how many times each were opened. A net totals section lists total money added to all manual drops and validator drops, lists total deposits (cash removed from drops) and total taken from vend (vend or unload), and lists the net total for the user.

A cash report includes a vend section that shows the total number of tubes and the amount of money in each column per vend assembly, as well as the total of all vends. A validator drop cash section shows the amount of money in each validator by validator name, as well as the total amount of validated money. A manual drop cash section shows the amount of money in each manual drop location, as well as the total money in manual drops. A total money in system section shows the combined sum of moneys in vend, validated drops, and manual drops.

An audit report includes a report data section showing the report start and end time/date, device, user, and event report criteria. The report itemizes all events at each unit by identifying the event, the location, and the user triggering the event. In other words, the audit report can provide an activity recap for each unit in the system by accumulating financial information such as the amount of money loaded, unloaded (showing a total overage or shortage, if applicable), vended, manually dropped, and dropped to validators, as well as security information such as the number of times doors were opened. In addition, events such as an attempt to log into the system using an incorrect PIN are reported and tracked. The system can be programmed to determine if the next entry after such an incorrect attempt is valid, and assume accordingly that the user simply made a mistake when originally entering the PIN.

A configuration report provides an exhaustive list of system devices, all components of each device, and all variables of each component. A system report can be generated to track messages that are initiated by the system instead of the user. For example, a report can be generated detailing detection of a bill jam in a particular validator device, including subsequent repair activity performed such as power-up and power-down cycling.

All user data, such as identification, identification type (User Number or electronic key), name, and user permissions, is stored in the system and may be printed or displayed. System configuration information such as device arrangement and communication setup, column values, delays, timelocks, is included on a configuration report. If the integrity of the system or any of its components is in question, a diagnostic status report is available. This report lists all components and their operational status. A system report is also available to list all system messages (errors) generated and logged during the report period. This report is a very effective way of monitoring the system for full validators, bill jams, or other system generated audit entries.

Users may be added with any combination of authority and any type of available identifier. A system identifier is required, and may be in the form of a user number, electronic key, or other suitable arrangement. For example, a Biometrics® fingerprint reader can be installed to provide recognition of an index finger for identification. The purpose of an identifier is to provide the system with a way to determine who is accessing it. Once identified, the system can determine what permissions have been assigned to that user, as well as the activity history of that person. A name and personal ID are stored in the system and referenced to the identifier. Thus, when a user logs-in, the system can identify the user by name on the display as well as on any printed or displayed reports.

Identifiers are verified by a PIN, which is associated with a user upon enrollment into the system. One exception is an armored car identifier, which preferably uses verification from a second enrolled user instead of a PIN associated with the armored car personnel. Users may change their own PIN numbers at will, or as required by the system.

Enrollment involves entering a user's identifier, personal ID (such as a social security number), temporary PIN, name, and default permission level. Once enrolled, the user's PIN and permission levels may later be modified. The name and personal ID cannot be changed. To associate a different personal ID or name with an identifier, the user (identifier) must be deleted from the system and enrolled again as a new user.

A user may become inactive by one of two methods. An authorized user can inactivate a person to disable their access without actually removing them from the system. This can be done for example to a user who is on vacation or temporarily transferred. The second method is automatic inactivation. This occurs when the system does not detect a user accessing the system or safe for a predetermined amount of time, such as one or two months. Once a user becomes inactive, an authorized user may allow the user to become active again by assigning a temporary PIN. Note that a temporary PIN may be issued to a user even if they are already active.

In further accordance with the present invention, the central control unit is programmed to recognize different levels authority or permission to access different operations of the system. Nearly all system operations require the user to have a certain level of permission. For example, common tasks such as making drops or vending change is usually granted to the majority of users, while certain doors may be off-limits to all but a few users. Individuals are assigned a default permission level when they are enrolled. Electronic keys may be pre-coded with specific permissions, or may be set to operate using a system default permission level. Permission defaults as well as individual user permissions may be modified. A user cannot enroll other users with a higher default permission level than their own. In addition, a permission level can be assigned as a function of the time or date, i.e., the permission is valid only during the assigned time or date.

In one embodiment, the system recognizes the following default permission levels. The first level is a door permission. Users with a general door permission may open any door belonging to an access group to which they have access. Any door may be assigned to any of 32 access groups. A user will have access to specific groups and the doors assigned thereto. In situations where dual access is provided, or verifying armored car override access, the secondary user still must have door access.

The second permission level is a vend permission, which is similar to door permission in that the same 32 access groups can be used. Every column on every system dispensing unit is assigned a group number. For a user to vend a column, the user must have general vend permission and access to the group assigned to that column. Load and unload functions, also related to the dispensing system, are globally allowed or disallowed by permission, without regard to group number.

The third permission level is a drop permission. Users need general drop permission in order to make drops, whether by validator or manual drop. In addition, drop permission is required in order to access the Buy Change and any other related drop functions.

The next level of permission is a run report permission. While all enrolled users may run their own operator reports, running any other report requires the applicable report permission. The reason for specifying particular report permissions for particular users is to allow certain people to run some reports, such as an end day report, without being able to access other reports such as an audit report. Users who load or unload dispensing systems need to be able to run a cash report, but may not have any need to run an enrolled user report, and so forth.

Another level of permission allows a user to adjust the system or unit clock by one or two minutes. Setting the system's clock (time, date, and DST) can be controlled by a separate, advanced permission.

User functions require a permission level to allow a user to enroll users, edit users, set user permissions, and edit system level user functions. Additional user parameters may be set by advanced users, such as adding or editing default permissions, setting PIN length and life, and setting auto delete and auto inactivate times.

The following permissions can be generally restricted to loss prevention or security manager level personnel:

User Related:
  Set Default Permissions
  Set PIN Length
  Set PIN Life
  Set Auto Delete Time
  Set Auto Inactivate Time Access Related:
  Set Lock Delays
  Set Lock Timelocks
  Set Lock Access Time
  Set Lock Alarm Time
  Set Vend Delay
  Set Variable Vend Delay
  Set Vend Timelock
  Set Unload Delay
  Set Unload Timelock
  Set Dual Key Accounting Related:
  Set Cash
  Set Column Values & Levels
  Set Receipt Printing
  Set Validator Acceptance Direction
  Set Validator Acceptance Denominations
  Set Auto End Day Time
  Set Variable Vend Time Clock Related:
  Time
  Date
  Auto Daylight Savings Enable System Related:
  Device Names
  Delete Device
  Set Idle Text
  Set Modem Configuration
  Set Remote Configuration.

Factory level permissions are provided for the following advanced system functions:
  Master Reset Add Device
  Set Serial Number Set Company Code Set Key Required
  Set Fingerprint Required Set Lock Behind Set Lock Sensors Set
  Solenoid Time
  Set Remote Solenoid Actuate Button.

Figure 12:
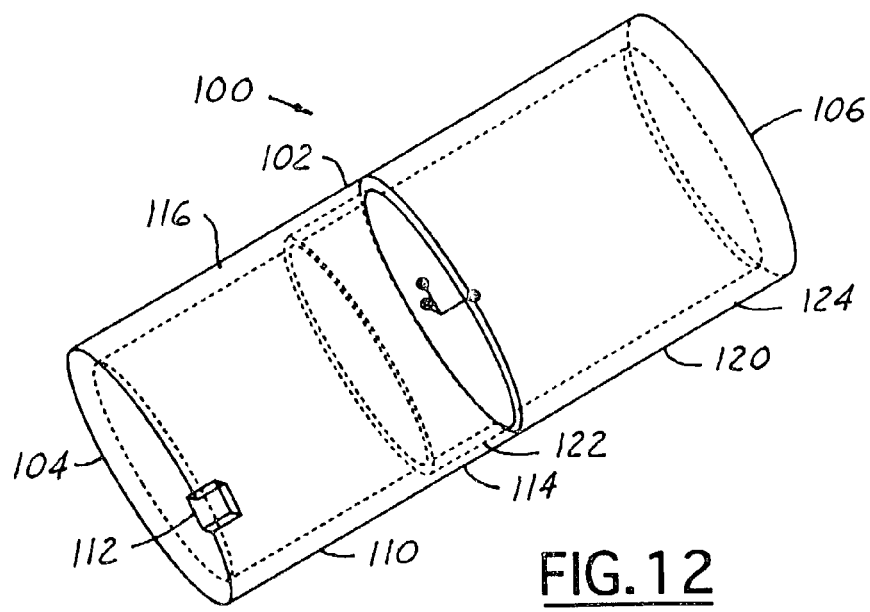
FIG. 12 illustrates a preferred embodiment of a money tube made in accordance with the present invention.
Figure 13:
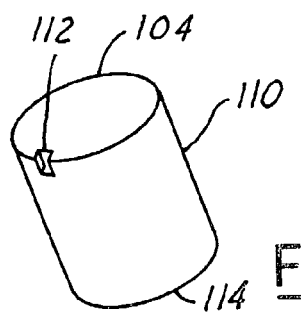
FIG. 13 illustrates the first body portion of the money tube of FIG. 12.
Figure 14:
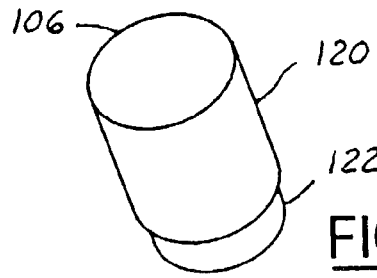
FIG. 14 illustrates the second body portion of the money tube of FIG. 12.
Figure 15:
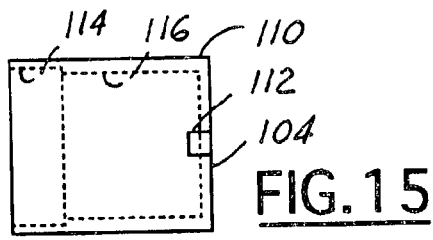
FIG. 15 is a top view of the first body portion of the money tube of FIG. 12.
Figure 17:
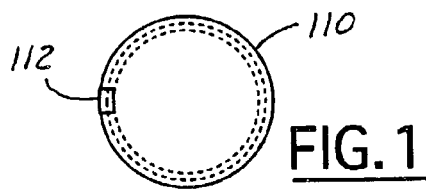
FIG. 17 is an end view of the first body portion of the money tube of FIG. 12.
Figure 16:
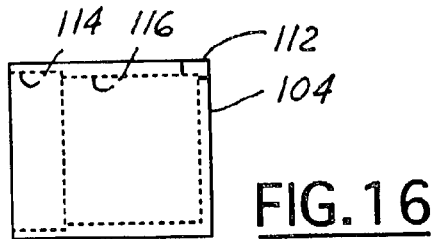
FIG. 16 is a front view of the first body portion of the money tube of FIG. 12.
Figure 18:
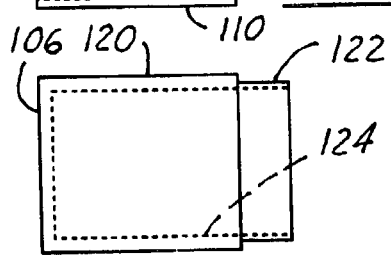
FIG. 18 is a top view of the second body portion of the money tube of FIG. 12.
Figure 19:
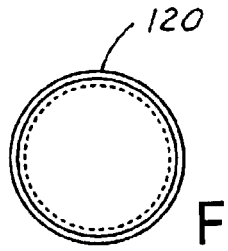
FIG. 19 is an end view of the second body portion of the money tube of FIG. 12.

With reference now to FIGS. 12–19, a preferred embodiment of the money tube of the present invention is generally indicated at 100. Money tube 100 includes a centrally divided tube body with a central portion 102, a first end 104, and a second end 106. The money tube is shown in assembled form in FIG. 12. The money tube body is composed of a first body portion 110 and a second body portion 120. First body portion 110 is best shown in FIG. 13 in perspective view and in FIGS. 15–17 in top, front, and end views, respectively. Second body portion 120 is best shown in FIG. 14 in perspective view, and in FIGS. 18 and 19 in top and end views, respectfully. First body portion 110 includes air hole 112 to allow air to exit the tube when placing the tube parts together, and also includes first central connector 114. Second body portion 120 includes second central connector 122. The first and second central connectors 114 and 122, respectively, engage each other at the tube body central portion 102 when the two body portions are connected to each other to hold the first body portion and the second body portion together (FIG. 12). In the preferred implementation that is illustrated, first central connector 114 is a female type connector and second central connector 122 is a male type connector. Overlapping engagement of the connectors holds the body portions together. Preferably, the overlapping engagement forms an interference fit. Further, in the preferred implementation, the body portions have closed ends 104 and 106, and the tube body is generally cylindrical with a circular cross-section. The money tube parts may suitably be formed of molded plastic. Of course, other materials cold be used in the alternative.

It is appreciated that the money tubes of the present invention having centrally divided tube bodies may be used together with money dispensing units. A suitable money dispensing unit may be a controller unit, a remote unit, or a stand alone unit.

Figure 20:
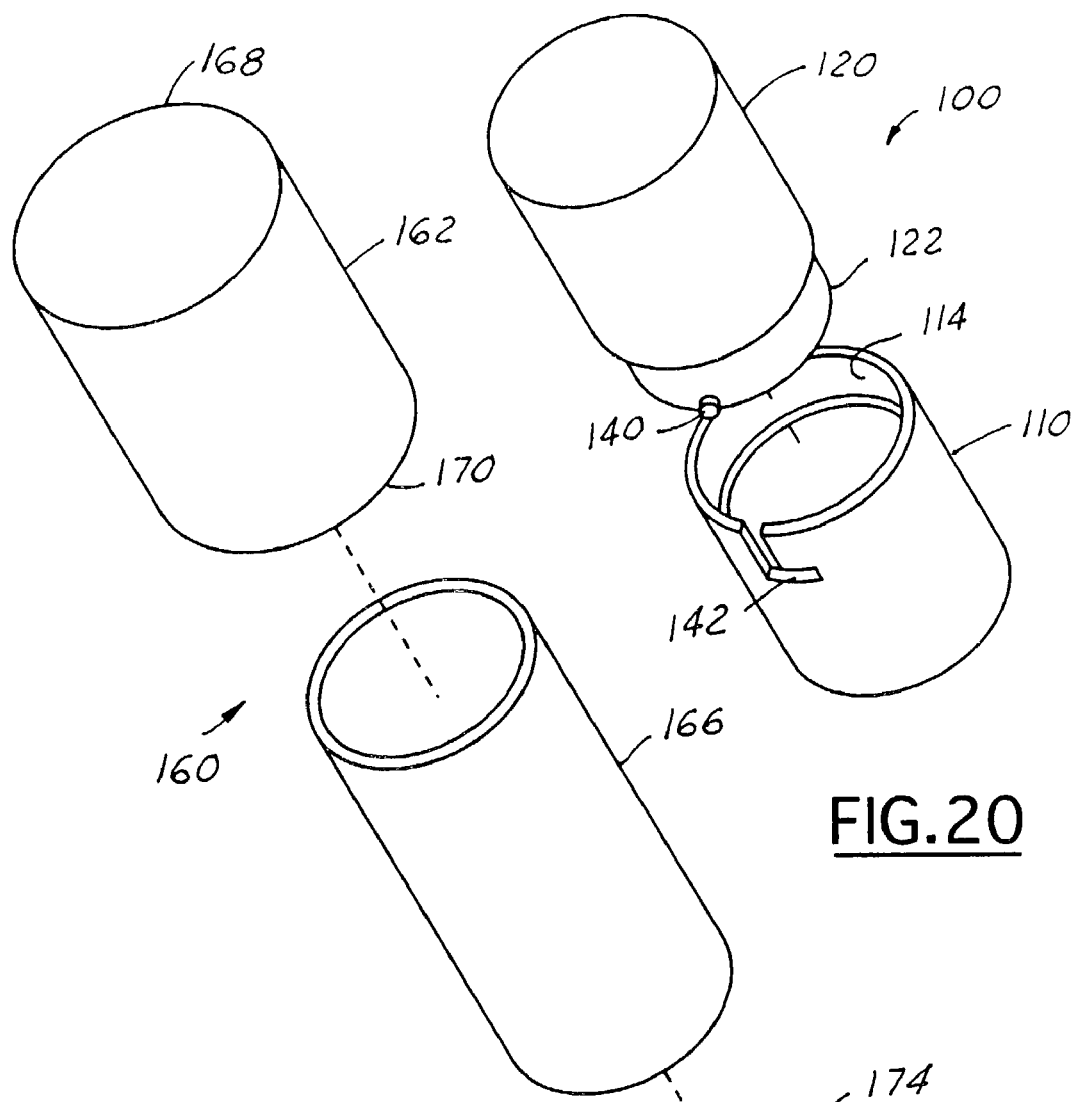
FIG. 20 is an exploded perspective view of an alternative money tube.
Figure 21:
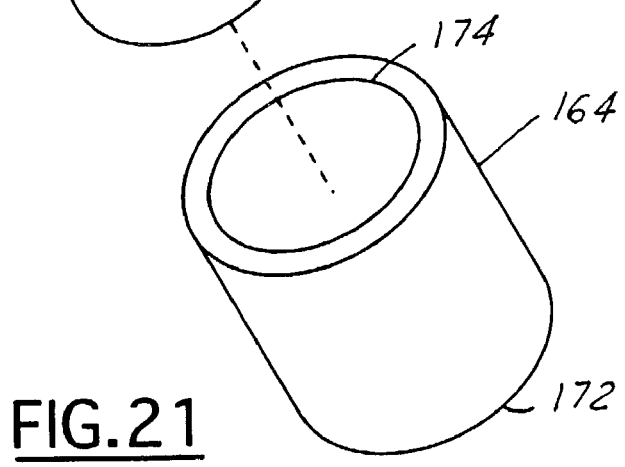
FIG. 21 is an exploded perspective view of another alternative money tube.

An alternative embodiment for a money tube of the present invention is illustrated in FIG. 20. Like reference numerals are used to represent like parts. Male type connector 122, in this embodiment, further includes an outwardly extending post 140. Female type connector 110, in this embodiment, further includes an L-shaped slot 142 that receives post 140 during the overlapping engagement of the connectors. Another alternative embodiment of a money tube is shown in FIG. 21, with the alternative embodiment of the money tube generally indicated at 160. Money tube 160 includes a centrally divided tube body composed of a first body end portion 162, a second body end portion 164, and a body middle portion 166. First body end portion 162 includes a first end 168 and defines a first central connector 170. Second body end portion 164 includes a second end 172 and defines a second central connector 174. The first and second central connectors 170 and 174, respectively, engage body middle portion 166 at the tube body central portion to hold first body end portion 162 and second body end portion 164 to body middle portion 166. Preferably, first and second central connectors 170 and 174, respectively, engage each other at the tube body central portion when the money tube is assembled. Alternatively, first and second central connectors 170 and 174, respectively, may be slightly spaced from each other at the tube body central portion when the money tube is assembled.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A money tube for use in a money dispensing unit, the money tube comprising:

a centrally divided tube body having a first end, a second end, and a central portion, the tube body being composed of a first body portion and a second body portion, the first body portion including the first end and defining a first central connector, the second body portion including the second end and defining a second central connector, the first and second central connectors engaging each other at the tube body central portion when connected to each other to hold the first body portion and the second body portion together, wherein the first and second body portions connect and the first and second ends contain money in the tube body.

2. The money tube of claim 1 wherein the first central connector is a female type connector and the second central connector is a male type connector such that overlapping engagement of the female type connector and the male type connector holds the first body portion and the second body portion together.

3. The money tube of claim 2 wherein the overlapping engagement is an interference fit.

4. The money tube of claim 2 wherein the male type connector includes an outwardly extending post, and wherein the female type connector includes an L-shaped slot receiving the post during the overlapping engagement.

5. The money tube of claim 2 wherein the tube body first end is a closed end.

6. The money tube of claim 2 wherein the tube body second end is a closed end.

7. The money tube of claim 1 wherein the tube body is generally cylindrical with a circular cross-section.

8. The money tube of claim 1 wherein the first body portion and the second body portion are formed of molded plastic.

9. In combination with a money dispensing unit having a housing including a set of openings in the housing arranged to be loaded with money tubes each containing money of a predetermined value, and a separate opening and dispensing tray in the housing to dispense money tubes for removal from the dispensing unit, a money tube comprising:

a centrally divided tube body having a first end, a second end, and a central portion, the tube body being composed of a first body portion and a second body portion, the first body portion including the first end and defining a first central connector, the second body portion including the second end and defining a second central connector, the first and second central connectors engaging each other at the tube body central portion when connected to each other to hold the first body portion and the second body portion together, wherein the first and second body portions connect and the first and second ends contain money in the tube body.

10. The combination of claim 9 wherein the first central connector is a female type connector and the second central connector is a male type connector such that overlapping engagement of the female type connector and the male type connector holds the first body portion and the second body portion together.

11. The combination of claim 10 wherein the overlapping engagement is an interference fit.

12. The combination of claim 10 wherein the male type connector includes an outwardly extending post, and wherein the female type connector includes an L-shaped slot receiving the post during the overlapping engagement.

13. The combination of claim 10 wherein the tube body first end is a closed end.

14. The combination of claim 10 wherein the tube body second end is a closed end.

15. The combination of claim 9 wherein the tube body is generally cylindrical with a circular cross-section.

16. The combination of claim 9 wherein the first body portion and the second body portion are formed of molded plastic.

17. A money tube for use in a money dispensing system, the money tube comprising:

a centrally divided tube body having a first end, a second end, and a central portion, the tube body being composed of a first body end portion, a second body end portion, and a body middle portion, the first body end portion including the first end and defining a first central connector, the second body end portion including the second end and defining a second central connector, the first and second central connectors engaging the body middle portion at the tube body central portion to hold the first body end portion and the second body end portion to the body middle portion, wherein the first and second ends contain money in the tube body.

18. The money tube of claim 17 wherein the first and second central connectors engage each other at the tube body central portion.

19. In combination with a money dispensing unit having a housing including a set of openings in the housing arranged to be loaded with money tubes each containing money of a predetermined value, and a separate opening and dispensing tray in the housing to dispense money tubes for removal from the dispensing unit, a money tube comprising:

a centrally divided tube body having a first end, a second end, and a central portion, the tube body being composed of a first body end portion, a second body end portion, and a body middle portion, the first body end portion including the first end and defining a first central connector, the second body end portion including the second end and defining a second central connector, the first and second central connectors engaging the body middle portion at the tube body central portion to hold the first body end portion and the second body end portion to the body middle portion, wherein the first and second ends contain money in the tube body.

20. The combination of claim 19 wherein the first and second central connectors engage each other at the tube body central portion.

* * * * *